United States Patent [19]

Smith

[11] 4,045,059
[45] Aug. 30, 1977

[54] MULTIPLE CONDUIT JOINT, CONSTANT INTERFACE AREA SWIVEL

[75] Inventor: Jack Edward Smith, Whittier, Calif.

[73] Assignee: Litton Systems, Inc., Beverly Hills, Calif.

[21] Appl. No.: 649,031

[22] Filed: Jan. 14, 1976

[51] Int. Cl.$^2$ .................... F16L 27/08; F16L 43/00
[52] U.S. Cl. ................... 285/181; 285/185; 285/275
[58] Field of Search .............. 285/181, 185, 273, 275; 251/209

[56] References Cited

U.S. PATENT DOCUMENTS

| 628,692 | 7/1899 | Campbell | 285/185 X |
|---|---|---|---|
| 1,123,839 | 1/1915 | Bridges | 285/181 X |
| 2,831,709 | 4/1958 | Shaw et al. | 285/185 |
| 3,409,270 | 11/1968 | Hulsey | 251/209 |
| 3,450,422 | 6/1969 | Brown et al. | 285/181 X |

FOREIGN PATENT DOCUMENTS

| 823,720 | 10/1937 | France | 285/181 |
|---|---|---|---|
| 339,724 | 4/1936 | Italy | 285/185 |
| 879,827 | 10/1961 | United Kingdom | 285/181 |

Primary Examiner—Thomas F. Callaghan
Attorney, Agent, or Firm—Donald J. Ellingsberg

[57] ABSTRACT

A conduit joint is shown and described having ingress and egress ports respectively on a first and second conduits. The ports open to a substantially matching area of relatively movable, pneumatic joinder, and have tapered chambers leading therefrom. A method of passing fluids from one conduit through an articulate joint to a second conduit in a helical path having no flow restriction, chamber expansion or the like, is also described.

5 Claims, 11 Drawing Figures

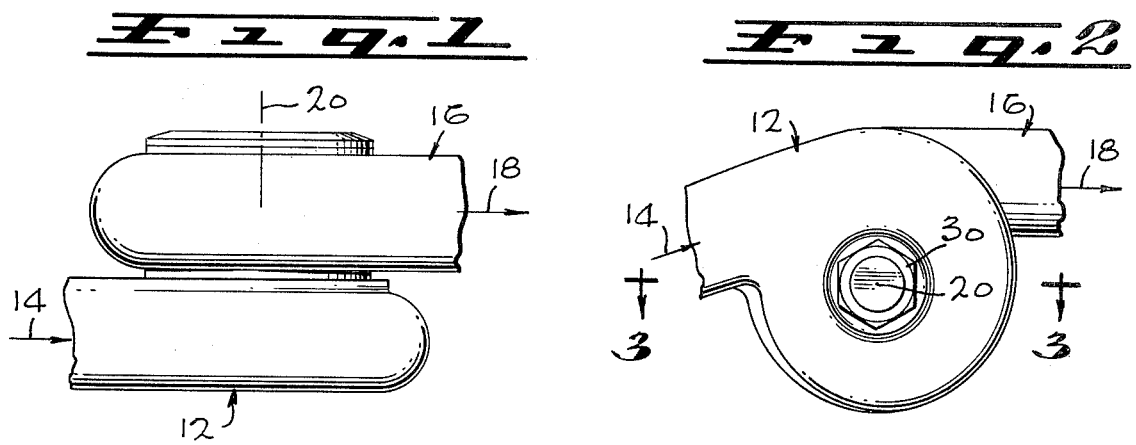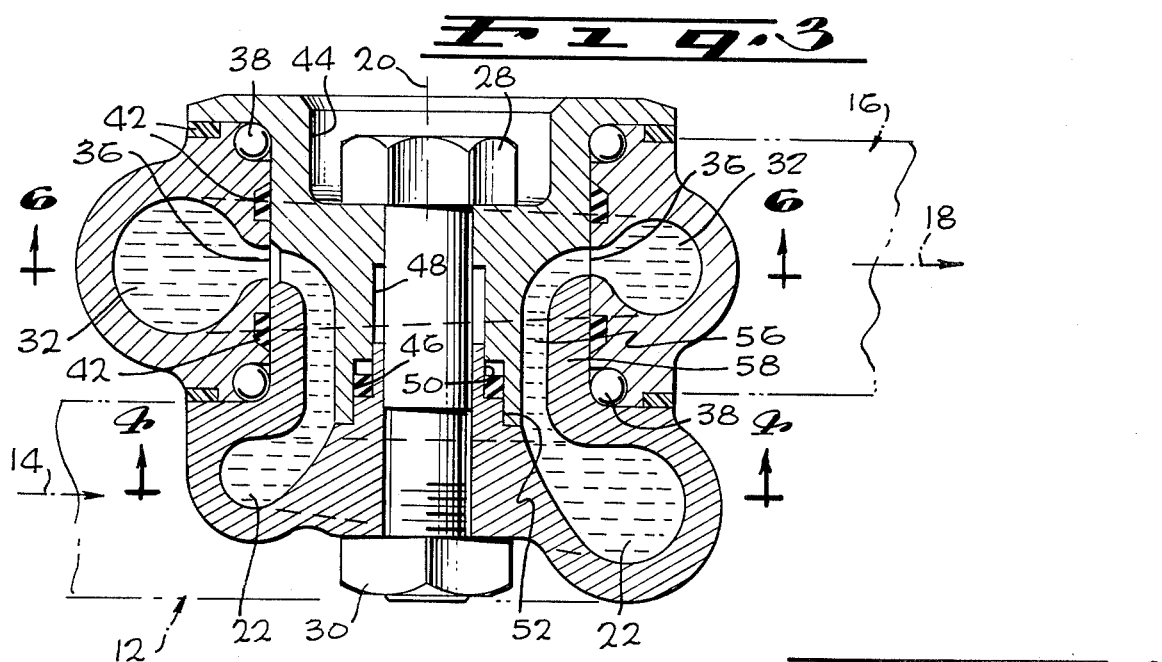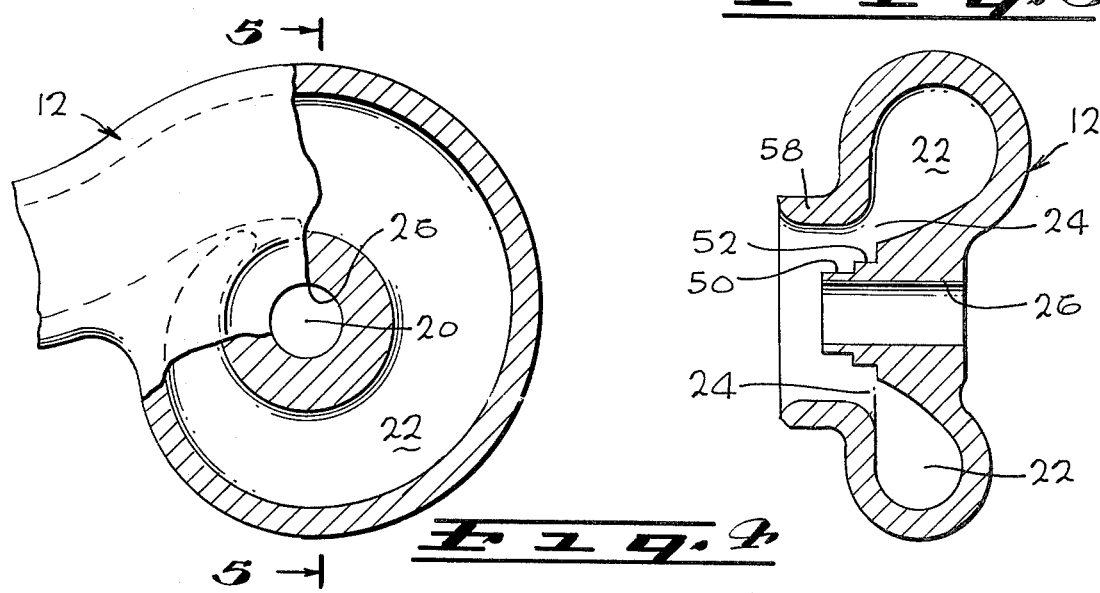

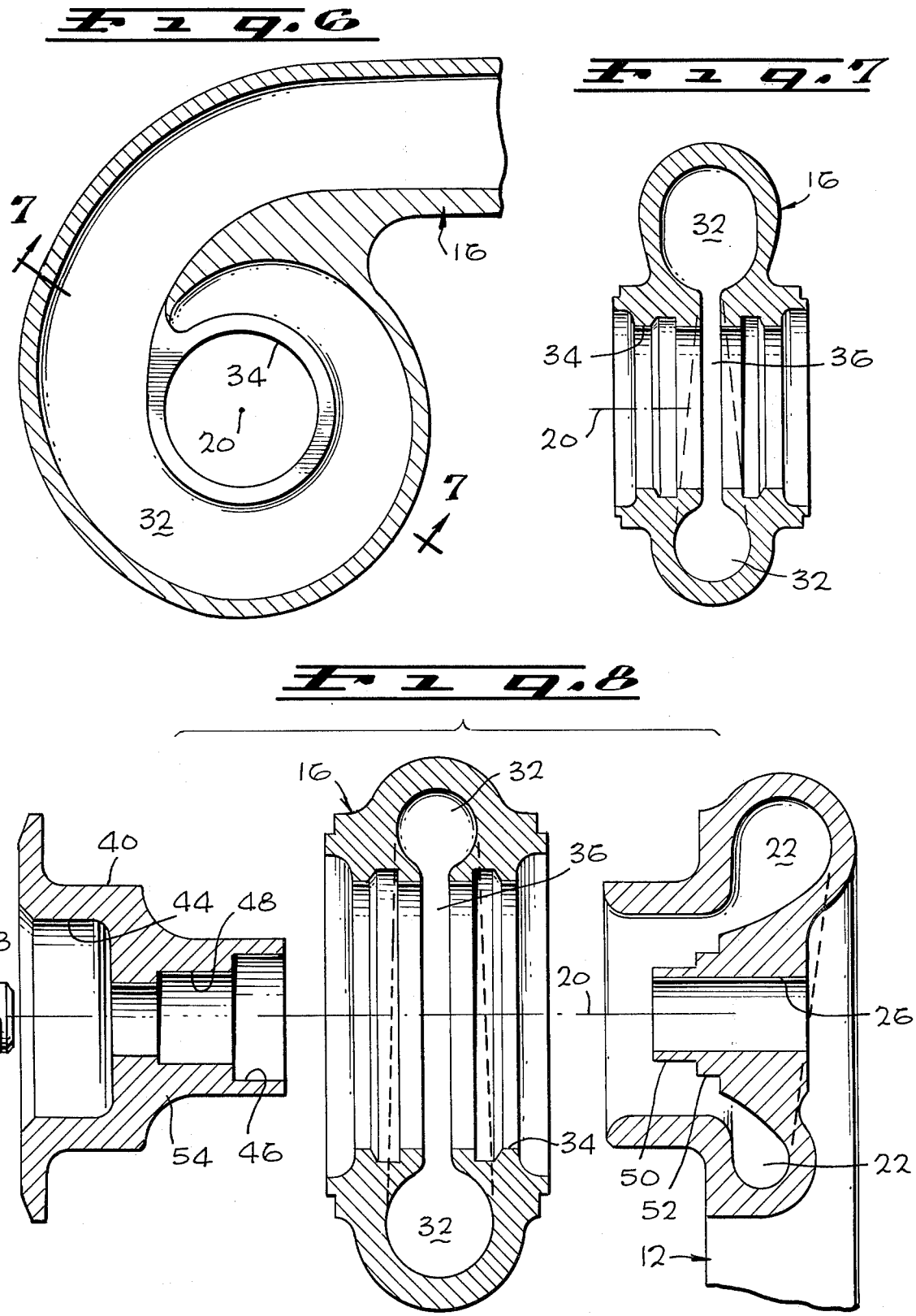

MULTIPLE CONDUIT JOINT, CONSTANT INTERFACE AREA SWIVEL

BACKGROUND OF THE INVENTION

Articulate pipe-coupling joints have been known before. A typical such arrangement has been seen in patents at least as early as 1885, as seen in Patton, U.S. Pat. No. 318,790. A later patent representative of a more recent innovation in the design of pneumatic, fluid-conducting articulate swivel joints may be seen in Hulsey, U.S. Pat. No. 3,409,270. As may be appreciated by any cursory search through patented or technological teachings of pipe-coupling and pneumatic conveying articulate joints, fluid from one pipe or conduit enters into the joint areas, wherein a chamber is usually provided. The chamber usually opens pneumatically to a chamber of the second pipe or conduit. The pipes are articulate or movable about some pivot point or pivot line which usually extends through the chamber in some fashion.

In the past, it has been found that fluids passing from one conduit to the other conduit through such articulate joints, are faced with a flow restriction and turbulence when the fluid enters into the expanded chamber of one conduit which complementally faces a similar expanded chamber of the second conduit. In some cases fluid from one conduit must enter into a narrower passageway, thus being subject to a baffle or restriction means in its flow. In all articulate swivel conduit couplings known before, the fluid is affected in its flow in such detrimental manners. It has been sought in certain, specific fluid conduit coupling arrangements to have an articulate, movable swivel assembly through which fluid may flow without baffle or constrictive influences by sudden and abrupt changes in the flow chamber of one conduit complementally opening into the flow chamber of the second conduit.

BRIEF DESCRIPTION OF THE DRAWINGS

FIG. 1 illustrates an elevational view of the preferred embodiment of the invention;

FIG. 2 illustrates a top view of the preferred embodiment of the invention;

FIG. 3 illustrates a partial cross-sectional view of the preferred embodiment of the invention taken along line 3—3 of FIG. 2;

FIG. 4 illustrates partial cutaway view of one part of the preferred embodiment of the invention;

FIG. 5 illustrates a cross-sectional view of a part of the invention as seen in line 5—5 of FIG. 4;

FIG. 6 illustrates a cross-sectional view of a part of the invention as seen in FIG. 3;

FIG. 7 illustrates a cross-sectional view taken along line 7—7 of FIG. 6;

FIG. 8 illustrates an exploded cross-sectional view of the preferred embodiment of the invention;

SUMMARY

Figure 9:
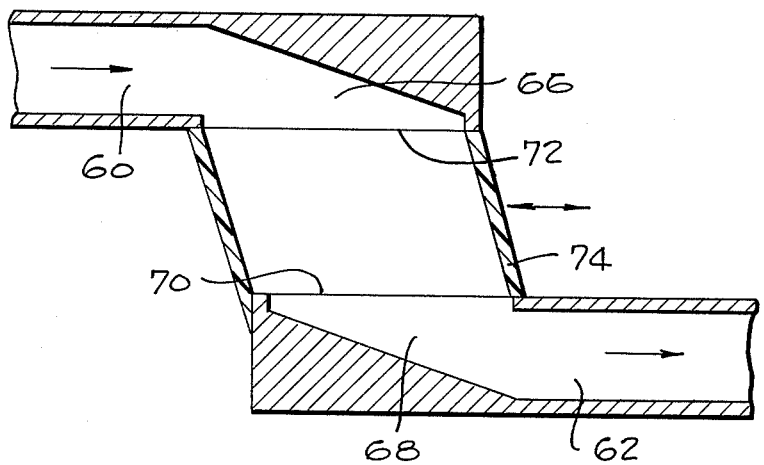
FIG. 9 illustrates schematically an alternative form of the invention.

A multiple conduit joint is provided wherein two fluid conduits are joined together providing a relatively unbaffled and unrestricted flow of fluids from one conduit to the other. The joint assembly is provided with tapered chambers pneumatically in contact or in connection with respective conducting annular orifices, each chamber either directly or indirectly opening into the conducting annular orifice of the other conduit. The conduits are movable relative to each other, so that the openings will be in a position to conduct fluids from one conduit to the other. In the preferred embodiment, the tapered chambers and conducting orifices are arranged in an annular or substantially circular pattern in order to create a helical movement of the conducted fluids. A method of conducting fluids from one conduit to another in a basically helical path in chambers and conducting orifice opening from one conduit to another conduit providing for basically unrestricted flow is provided.

DESCRIPTION OF THE PREFERRED EMBODIMENT

In order to overcome the problems of the baffle or restricted flow as found in most available swivel assemblies, a swivel assembly as first seen in FIGS. 1 and 2 of the drawings is described. It is believed that the smooth flow of fluid in conduits is best achieved when the angle between the direction of fluid flow and the conduit walls is as small as possible. The fluid in a circular conduit would have a tangential direction. The conduits in a swivel joint rotate about a center of rotation, usually. It was believed that the similarity of these two characteristics would provide for a conduit swivel joint assembly having no baffles and no expansion turbulence possibilities.

In the preferred embodiment of the invention, a helical or spiral motion is imparted by the joining end of one conduit. The joining end of the second conduit is designed or arranged to receive the fluid flowing in a tangential direction relative to the swivel center of rotation. In order to transfer the fluid from one conduit to the other, both of which must rotate about a common axis, a spiral or helical fluid flow path is taught. It is believed that the swivel operates because of a basically helical or spiral motion imparted to the fluid passing from one conduit to another conduit in the articulate joint assembly.

The preferred embodiment of the invention as described in detail in this specification contemplates the movement of the fluid in the first conduit in a circular motion. The end of the first conduit is arranged in a tapered chamber set as a beginning of a first helical turn, which begins the motion of the fluid in a helical turning or spiral fashion. The second conduit joined in the assembly receives the fluid in a basically circularly arranged tapered chamber. Thus the spiraling or helical motion of the fluid from the first chamber is received by the second chamber in a complemental passageway or path from which the fluid progresses. Each of the chambers has an annular or substantially annular orifice interface. The annular orifice interface of one chamber is equal to the annular orifice interface of the other chamber. These annular orifices may movably coincide, or may pneumatically open into a center passageway whose volume will remain constant during the articulate movement of the swivel assembly conduits.

The invention as described in the preferred embodiment can best be seen in a simple form in FIG. 3. The assembly is held together by threaded bolts 28 and nut 30. The assembly as seen in the preferred embodiment consists of three basic parts, not including the fastening bolt and nut. The three elements of the preferred embodiment swivel assembly are seen exploded in FIG. 8 of the drawings. A detailed explanation of each of the component parts and their interrlationship, and the relationship of the flowing fluid relative to the interrelated parts in the preferred embodiment, will not be described.

The swivel assembly is comprised of a first ingress conduit 12 into which fluid flows as indicated by arrow 14. Fluid continues within the swivel assembly and egresses in conduit 16, as indicated by the arrow 18. The conduit 16 is laterally rotatably movable relative to the conduit 12 about the axis 20. Thus, the conduit 12 is in an articulate relationship with conduit 16.

In FIG. 3 is shown a partial cross-sectional view of the articulate joint as seen along line 3—3 of FIG. 2 of the drawings. In FIG. 3 as in all figures showing the preferred embodiment, like reference numerals will be used to indicate like elements, so to expedite the understanding of the preferred embodiment of the invention. Thus fluid egresses in conduit 16 as shown by arrow 18. Similarly conduit 12 receives fluid flowing in the direction indicated by arrow 14. The fluid received by conduit 12 is directed into a tapered chamber 22. The tapered chamber extends in a circular fashion almost completely around the center 20 of rotation. The arrangement of conduit 12 may be better seen in FIGS. 4 and 5 of the drawings. The tapered chamber 22 in conduit 12 tapers or progressively becomes smaller as the chamber progresses around the axis 20 of rotation from the ingress port. It is to be noted that chamber 22 has a definite end, or stops prior to the point around axis 20 where it might re-enter into the conduit 12.

For substantially the entire annular distance of the tapered chamber 22, a neck or substantially annular orifice 24 is provided so that fluid flowing within the tapered chamber 22 may escape therethrough, for purposes as will be described in detail below. A substantially cylindrical cavity 26 is provided so that means for securing the conduit 12 with the remaining elements of the preferred embodiment may be positioned. A threaded bolt 28 and nut 30 may be successfully used to keep the various components together, as shown.

Conduit 16 for allowing the fluid to egress as shown by the arrow 18, is likewise provided with a tapered chamber 32. The tapered chamber 32 progressively becomes smaller as it proceeds from the conduit 16 to its end. The precise construction of the preferred embodiment of the tapered chamber 32 and the construction of the end of conduit 16 may be seen in more detail in FIGS. 6 and 7 of the drawings. Similar to the end construction of conduit 12, conduit 16 is constructed having a cylindrical recess 34 through which fastening means, such as nut 30 and bolt 28 may be inserted for holding the assembly rotatably together. The tapered chamber extends circularly about axis 20 of rotation, but not so far that it would extend into the beginning of the chamber 32. Rather, chamber 32 ends definitely, as clearly seen in FIG. 6 of the drawings.

The tapered chamber 32 is provided along substantially its entire length, with a substantially annular orifice 36 seen better in FIG. 7 of the drawings. The orifice 36 allows the fluid to flow therethrough and into the tapered chamber 32. The housing of conduit 16 is provided with ball bearings 38 for allowing the conduit 16 to move relative to the conduit 12 and relative to the center element 40. The center element 40 will be described in greater detail below. Washers such as rubber washers 42 are strategically placed so as to prevent the fluid from escaping through the interfaces of the fluid pneumatic connections in the articulate joint.

Center element 40 is provided with a central, cylindrical recess 44 having sections varying in diameter for purposes that will be described, reference being had now to FIG. 8 of the drawings. A fastening element, such as bolt 28 can be inserted coaxially along axis 20 of rotation. Portions 46, 48 of this center recess are shaped so to fit complementally with the outside diameters of center portions respectively 50, 52 of the conduit 12. Preferably, a water tight but rotatable connection between the center element 40 and conduit 12 is accomplished. The outside wall 54 of center element 40 should then be seated so to provide with wall 58 of conduit 12 a cylindrical passageway 56. This substantially cylindrical passageway 56 should curve, as seen better in FIG. 3 of the drawings, so to present a constant, cylindrical area of pneumatic connection between passageway 56 and tapered chamber 32.

In operation the fluid flowing through the unique swivel assembly described herein operates as follows. Fluid enters ingress conduit 12 according to the arrow 14 as seen in FIG. 3 of the drawings. As the tapered chamber becomes smaller progressively, fluid is forced into the passageway 56 through the substantially annular orifice 24 of the chamber 22.

When the fluid first flows through the conduit 12 at a point normal to a radius of center 20, the fluid begins in the tangential direction around the center 20 substantially in the circularly arranged tapered chamber 22. This tangential motion can best be realized from FIG. 4 of the drawing. As may be appreciated from FIGS. 3 and 5 of the drawings, the fluid in this beginning tangential motion in tapered chamber 22 is forced into a spiral in the upward direction by virtue of the tapered chamber. The tapered chamber 22 has its upper boundary plane substantially normal to the center 20. The lower boundary plane of tapered chamber 22, however, is at an incline so that the tangential motion of the fluid in tapered chamber 22 begins a spiral movement.

A somewhat helical motion of the fluid then is caused in a vertical direction. The fluid progresses thus through passageway 56. The fluid's helical motion in passageway 56 forces itself upwardly through the orifice 36 and into the tapered chamber 32. The tapered chamber 32 becomes progressively larger as it progresses in the circular direction which the helical or spiral movement of the fluid takes. There is sufficient volume within the tapered chamber 32 to receive the fluid being forced through orifice 36 and into the tapered chamber 32. The fluid then progresses through the egress conduit 16 in the direction as seen by arrow 18.

As may be appreciated, the fluid experiences a progressively pressured reaction within the progressively decreasing tapered chamber 22. Complementally, the fluid enjoys increasingly reduced pressure as it flows into chamber 32 with its complementally designed progressively increasing chamber. The volume of passageway 56, however, remains constant. The conduit 12 may be moved relative to the conduit 16 by virtue of the ball bearings 38. The rotating movement, however, of conduit 12 relative to conduit 16 will always allow the complemental progressive tapers of the conduits 22, 32 to remain in complemental interacting relationship. The fluid flowing through the swivel assembly never enters into a larger or expanded chamber area, nor does the fluid meet with any rough baffle edges, restrictive passageways or other turbulance causing conditions. In this regard, it should be noted that optimum results are achieved when the passageway 56 in cross-sectional area is equal to the cross-sectional area of conduit 12 and of conduit 16.

The exploded constructional view of FIG. 8 of the drawings may give an indication to the reader how the element 40, conduits 12, 16 and fastening or securing means 28 fit together.

The schematic seen in FIG. 9 of the drawings indicates how an alternative embodiment of the invention may be perceived. Flow conduit 60 may receive fluid, while flow conduit 62 may allow fluid to egress. The conduit 60 ends in chamber 66 which is tapered to become progressively smaller. The conduit 62 likewise terminates in chamber 68 which is tapered to become continuingly smaller.

The tapered chambers 66, 68 have pneumatic openings 70, 72 to each other. The conduits 60, 62 may be longitudinally moved relative to each other as may be desired.

An enclosure 74 may be positioned so that the chamber 66 opens directly thereinto. The enclosure 74 in turn would open directly into opening 70 of chamber 68. The enclosure 74 should be constructed so that when the conduits 60, 62 are moved longitudinally relative to each other, the enclosure 74 will adjust so as to provide a constant area in cross-section throughout movement.

Provided that a proper fluid tight enclosure is made around the openings 70, 72 fluid flowing into conduit 60 will completely flow through the opening 70 of the tapered chamber 66, thence into tapered chamber 68 through opening 72. The fluid will then progress through the egress conduit 62.

The tapered chamber 66 forces the fluid into the complementally tapered receiving chamber 68. In such a manner, no baffling, constriction or expanded chamber turbulence will be suffered by the fluid thus passing through the joint.

Figure 10:
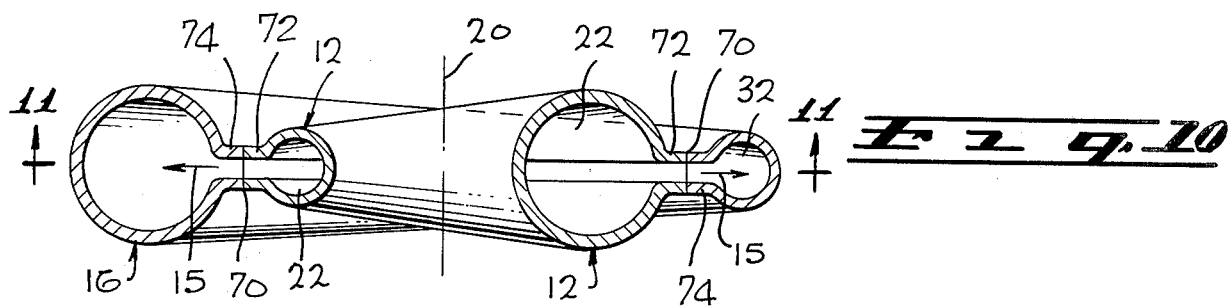
FIG. 10 illustrates a cross-sectional elevational view of yet another alternative of the preferred embodiment.
Figure 11:
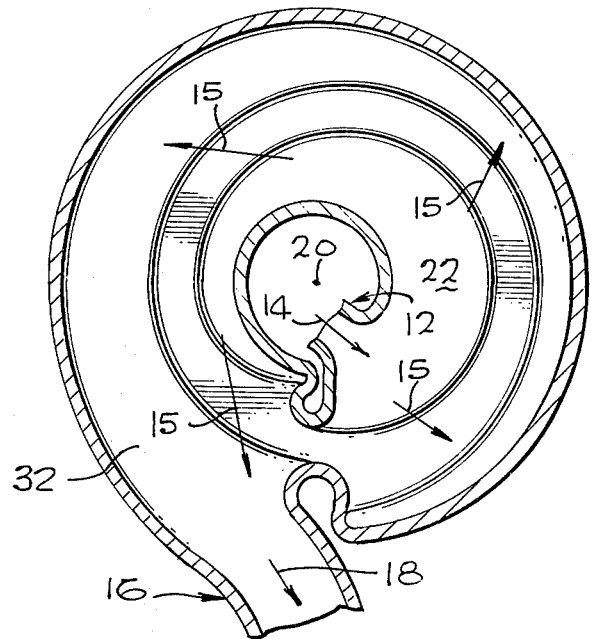
FIG. 11 illustrates a cross-sectional view taken along line 11—11 in FIG. 10 of the drawing.

In FIGS. 10 and 11 is shown another alternative of the preferred embodiment. In the embodiment as seen in FIGS. 10 and 11, the ingress conduit 12 is shown leading into tapered chamber 22. Conduit 16 is shown pneumatically leading from the tapered chamber 32. The movement of the fluid is seen by the direction arrows 14, 15, 18. Conduits 12, 16 may be rotated as desired about center 20 of rotation. Thus in operation the fluid ingresses in conduit 12 according to the direction given by arrow 14. The fluid then enters chamber 22 where it is subjected to progressively increased pressure by virtue of the progressive decrease of the diameter, or taper of the chamber 22. By virtue of this increased pressure, the fluid is forced from chamber 22 progressively through the interface 70 into tapered chamber 32. The interface 70 is at the end of a substantially annular orifice 72 of the conduit 12. Similarly, the chamber 32 opens through a substantially annular orifice 74 to the interface 70. As may be appreciated, there is no extended passageway as described in the preferred embodiment. Nonetheless, the area of interface 70 remains substantially constant no matter how the conduits 12, 16 are rotated about center 20 of rotation relative to each other.

While the preferred embodiment of my invention as seen through a circularly arranged articulate swivel assembly is shown, it may be appreciated by those skilled in the art that additional embodiments may be practiced without departing from the spirit of my invention. Thus, my invention should be limited only by the appended claims.

I claim:

1. A multiple conduit joint, comprising in combination:
   a. a first conduit having an ingress and a conducting port;
   b. a second conduit articulate with said first conduit and having an egress and a conducting port opening to said first conduit conducting port in a substantially matching area of complemental joinder;
   c. said first conduit being articulate about said second conduit thereby defining an axis of articulation;
   d. each of said conduits being provided with a tapered chamber coupled in fluid communication to said ingress and said egress ports respectively, opening on said matching, complemental area of joinder defining a continuous, undivided channel forming a fluid path through said conduits, the orientation of any length of said path bypassing said axis, said path following a curve winding around said axis without intersecting said axis; and
   e. a cross-sectional area of said tapered chamber of said first conduit complements a cross-sectional area of said tapered chamber of said second conduit so that any plane intersecting the tapered chamber of said first conduit and the tapered chamber of said second conduit will have a cross-sectional total area of intersection approximately equal to a cross-sectional total area of intersection of any other plane intersecting said first conduit or said second conduit where said planes are coaxial with said axis of articulated movement.

2. A multiple conduit joint as claimed in claim 1, wherein said substantially matching area of complemental joinder is cylindrical in shape.

3. A multiple conduit joint as claimed in claim 1 wherein said substantially matching area of complemental joinder is ellipsiodal, annular in shape.

4. Swivel joint according to claim 1 wherein said first conduit injects a fluid into said path in a direction which is tangential with respect to said curve.

5. Swivel joint according to claim 4 wherein said second conduit discharges said fluid from said path in a tangential direction with respect to said curve.

* * * * *